(12) United States Patent
Watanabe et al.

(10) Patent No.: US 7,242,877 B2
(45) Date of Patent: Jul. 10, 2007

(54) IMAGE FORMING APPARATUS AND IMAGE FORMING METHOD

(75) Inventors: Fumiyuki Watanabe, Shizuoka-ken (JP); Masayoshi Karasawa, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 223 days.

(21) Appl. No.: 11/018,509

(22) Filed: Dec. 17, 2004

(65) Prior Publication Data

US 2006/0133832 A1   Jun. 22, 2006

(51) Int. Cl.
G03G 15/08 (2006.01)
(52) U.S. Cl. .......................................... 399/27; 399/28
(58) Field of Classification Search .................... 399/8, 399/9, 13, 24, 25, 27, 28, 29, 42, 81
See application file for complete search history.

(56) References Cited

U.S. PATENT DOCUMENTS 6,275,664 B1* 8/2001 Wolf et al. .................... 399/8
6,915,090 B2* 7/2005 Fukaya ........................ 399/85
7,010,237 B2* 3/2006 Suzuki et al. ................. 399/27

FOREIGN PATENT DOCUMENTS

JP         9-85967       3/1997

* cited by examiner

Primary Examiner—Hoan Tran
(74) Attorney, Agent, or Firm—SoCal IP Law Group LLP; Steven C Sereboff; John E Gunther (57) ABSTRACT

An image forming apparatus is disclosed. A generation section generates color image data Y, M, and C and monochrome image data K. A first control section permits monochrome printing of the image data K when the generation section generates only the image data K. When the generation section generates color and monochrome image data, a determination section determines whether the image data Y, M, and C each correspond to a white image. A second control section deletes the image data Y, M, and C and permits monochrome printing of the image data K, when a determination result of the determination section is an affirmative result. A third control section permits color printing corresponding of the image data Y, M, C and K when the determination result of the determination section is a negative result.

16 Claims, 7 Drawing Sheets

IMAGE FORMING APPARATUS AND IMAGE FORMING METHOD

BACKGROUND OF THE INVENTION

1. Field of the Invention

The present invention relates to an image forming apparatus capable of color printing and monochrome printing, and an image forming method employed in the apparatus.

2. Description of the Related Art

In image forming apparatuses such as copy machines, printers, etc., image pattern data corresponding to a document image is analyzed, thereby generating image data Y indicating a yellow image, image data M indicating a magenta image, image data C indicating a cyan image, and image data K indicating a black image. Specifically, if the image pattern data corresponds to a monochrome image, only image data K is generated. If the image pattern data corresponds to a color image, image data items Y, M, C and K are generated.

However, there is a case where even if the image pattern data corresponds to a monochrome image, image data items Y, M and C are generated as well as image data K, based on the analysis result. In this case, although it is sufficient if monochrome printing using only a black developer is performed, color printing using all developers is performed. As a result, a yellow developer, magenta developer and cyan developer are wasted.

In light of the quality of printing as well, it is not preferable that color printing is performed instead of monochrome printing when monochrome printing should be performed.

BRIEF SUMMARY OF THE INVENTION

It is an object of an embodiment of the invention to provide an image forming apparatus and image forming method capable of accurately determining whether monochrome printing or color printing is needed, thereby avoiding waste of developers and enhancing the quality of printing.

In accordance with an aspect of the invention, there is provided an image forming apparatus comprising:

a generation section configured to analyze image pattern data corresponding to an image of a document to thereby generate image data Y indicating a yellow image, image data M indicating a magenta image, image data C indicating a cyan image, and image data K indicating a black image;

a first control section configured to permit monochrome printing corresponding to the image data K when the generation section generates only the image data K;

a determination section configured to determine whether the image data items Y, M and C each correspond to a white image, when the generation section generates the image data items Y, M, C and K;

a second control section configured to delete the image data items Y, M and C included in the image data items Y, M, C and K generated by the generation section, and to permit monochrome printing corresponding to the remaining image data K, when a determination result of the determination section is an affirmative result; and a third control section configured to permit color printing corresponding to the image data items Y, M, C and K generated by the generation section, when the determination result of the determination section is a negative result.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

[1] An embodiment of the invention will be described with reference to the accompanying drawings.

Figure 1:
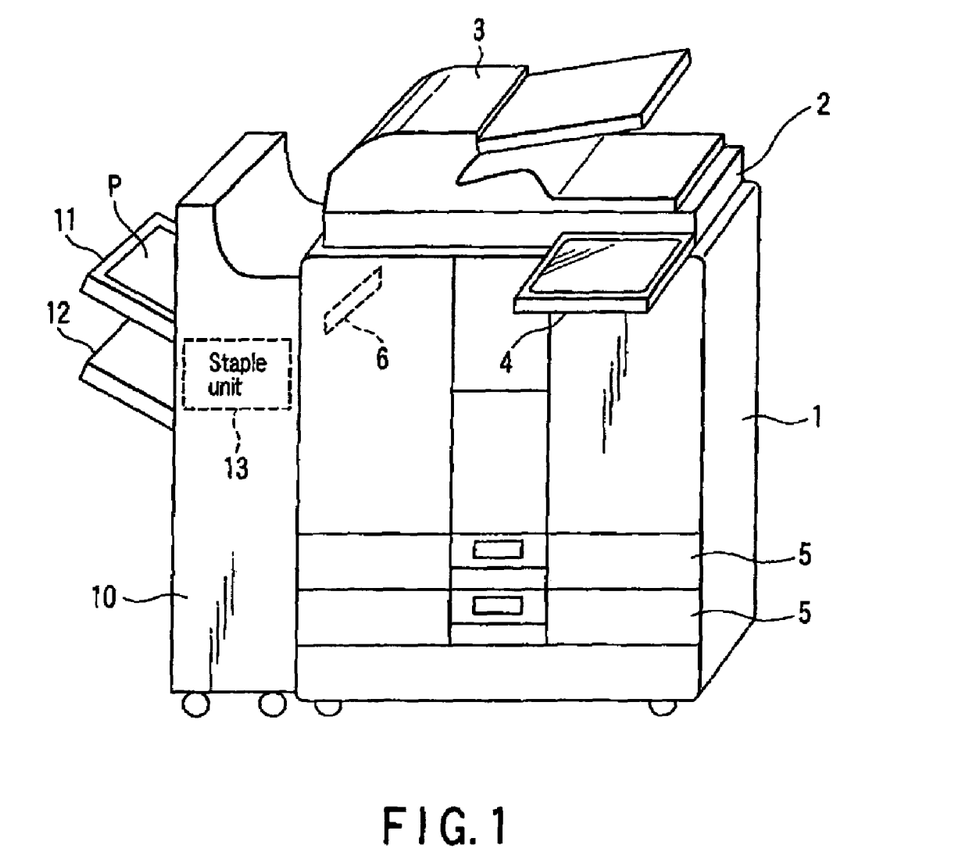
FIG. 1 is a view illustrating the outward appearance of an embodiment.

As shown in FIG. 1, a document table (glass plate) 2 is provided on the upper portion of the main unit 1 of an image forming apparatus. An openable/closable automatic document feeder (ADF) 3 serving also as a document table cover is provided on the main unit 1. A control panel 4 is provided on the upper surface of the main unit 1. A plurality of cassettes 5 that contain various sizes of paper sheets are provided at the lower portion of the main unit 1.

A paper ejection port 6 is formed in the side surface of the main unit 1, and a paper ejection unit 10 is mounted at the paper ejection port 6 side. The paper ejection unit 10 has trays 11 and 12 for receiving paper sheets from the paper ejection port 6, and has a staple unit 13 for stapling paper sheet ejected from the paper ejection port 6.

Figure 2:
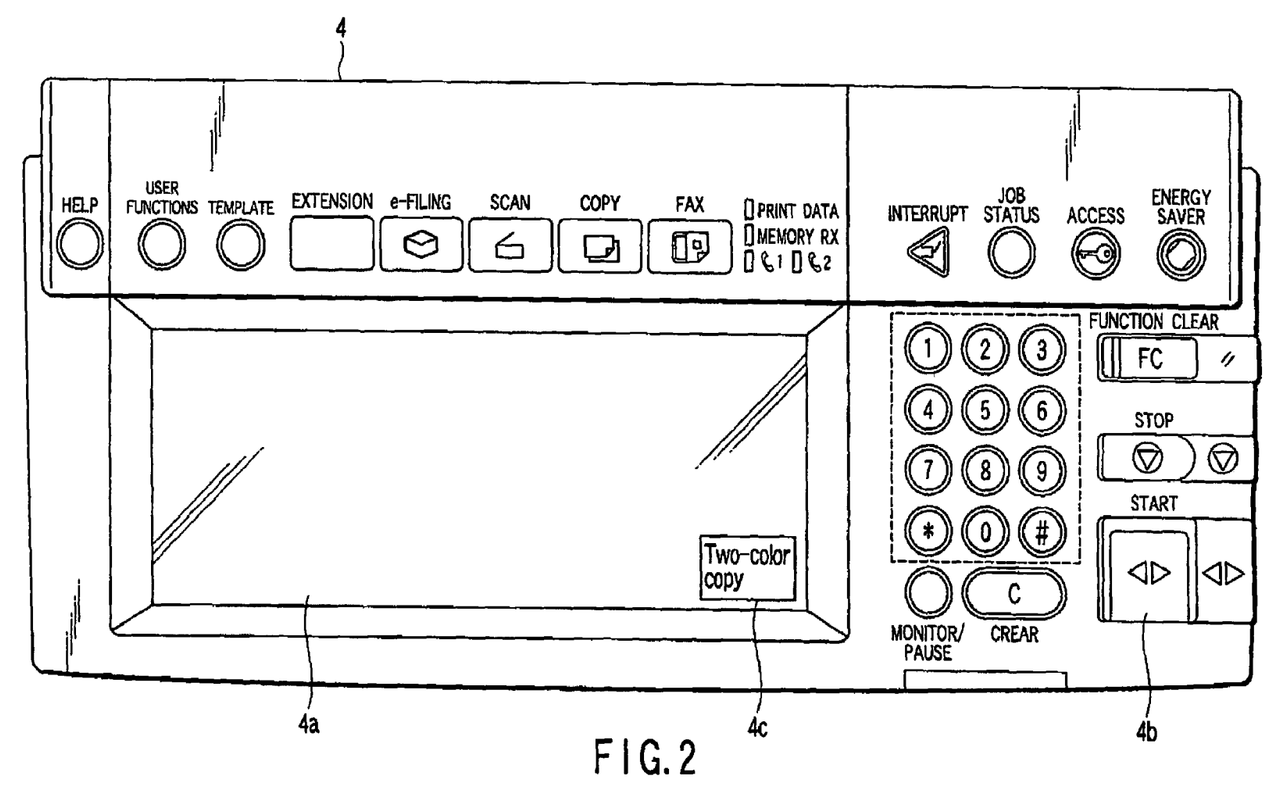
FIG. 2 is a view illustrating the structure of a control panel employed in the embodiment.

As shown in FIG. 2, the control panel 4 mainly comprises a liquid crystal screen 4a of a touch panel type, a start key 4b, etc. The liquid crystal display screen 4a displays two-color copy button 4c when necessary.

Figure 3:
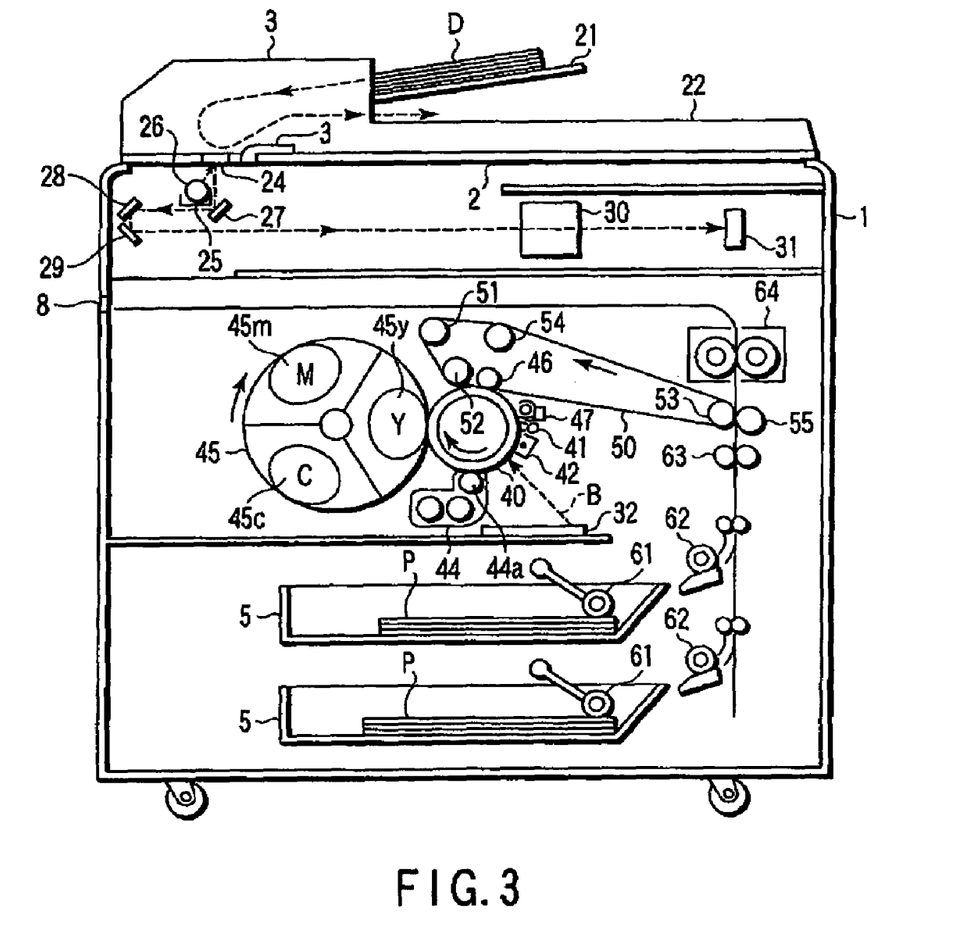
FIG. 3 is a view illustrating the internal structure of the embodiment.

FIG. 3 shows the internal structure of the main unit 1.

An indicator 23 is provided on one side of the document table 2. The step between the indicator 23 and the document table 2 serves as a reference position for setting documents. Further, a window 24 for reading documents is provided near the indicator 23.

A carriage 25 is provided below the document table 2 and window 24, ad an exposure lamp 26 is provided on the carriage 25. The carriage 25 can move (reciprocate) along the lower surface of the document table 2. When the carriage 25 reciprocates along the document table 2 and the exposure lamp 26 lights, a document placed on the document table 2 is exposed to the light.

When the document is exposed, a reflection light image of the document is acquired, and is projected onto a CCD (Charge Coupled Device) 31 via reflection mirrors 27, 28 and 29 and a lens block 30. The CCD 31 outputs an image pattern signal corresponding to the projected image. The image pattern signal output from the CCD 31 is digitally converted into image pattern data. The image pattern data is supplied to an image processing unit 75 described later.

The automatic document feeder 3 has a tray 21 for placing documents thereon, and is arranged to feed one by one a plurality of documents D, set on the tray 21, to the window 24 and passes therethrough, and to eject the documents D, passed therethrough, to the tray 22. When the automatic document feeder 3 is operated, the exposure lamp 6 is lit at a position opposing the window 24, whereby the light enters the window 24. The light entering the window 24 is applied to each document D passing over the window 24. As a result, a reflection light image is acquired from each document D, and is then projected onto the CCD 31 via the reflection mirrors 27, 28 and 29 and the magnifying lens block 30.

On the other hand, an exposure unit 32 for emitting a laser beam B is provided at substantially the central portion of the main unit 1. A rotary image carrier such as a photosensitive drum 40 is provided near the exposure unit 32. Around the photosensitive drum 40, there are provided a de-electrifying unit 41, charging unit 42, black developing unit 44, color developing unit 45, transfer roller 46 and cleaning unit 47 in the order mentioned. The laser beam B emitted from the exposure unit 32 is guided to the surface of the photosensitive drum 40 through the space between the charging unit 42 and block developing unit 44.

The de-electrifying unit 41 emits lamp light or emission diode light to the photosensitive drum 40 to eliminate a charge remaining on the surface of the photosensitive drum 40 (de-electrification). The charging unit 42 applies a high voltage to the photosensitive drum 40 to charge the surface of the photosensitive drum 40 with static electricity. When the thus-charged surface of the photosensitive drum 40 is exposed to the laser beam B of the exposure unit 32, an electrostatic latent image is formed on the photosensitive drum 40.

The black developing unit 44 is brought into contact with the surface of the photosensitive drum 40 when a black image is formed, and out of contact with the photosensitive drum 40 when a yellow, magenta or cyan image is formed. Further, the black developing unit 44 has a developing roller 44a that rotates in accordance with the rotation of the photosensitive drum 40 when the unit is brought into contact with the surface of the photosensitive drum 40. Using the developing roller 44a, the black developer (black toner) pre-contained is applied to the surface of the photosensitive drum 40. As a result, the electrostatic latent image on the photosensitive drum 40 is developed into a black visible image.

The color developing unit 45 is brought into contact with the surface of the photosensitive drum 40 when a yellow, magenta or cyan image is formed, and out of contact with the photosensitive drum 40 when a black image is formed. Further, the color developing unit 45 has a yellow developing section 45y, magenta developing unit 45m and cyan developing unit 45c. When a yellow image is formed, the yellow developing section 45y is brought into contact with the surface of the photosensitive drum 40. When a magenta image is formed, the magenta developing unit 45m is brought into contact with the surface of the photosensitive drum 40. When a cyan image is formed, the cyan developing unit 45c is brought into contact with the surface of the photosensitive drum 40. When the yellow developing section 45y is brought into contact with the surface of the photosensitive drum 40, it applies the contained yellow developer (yellow toner) to the surface of the photosensitive drum 40. As a result, the electrostatic latent image on the photosensitive drum 40 is developed into a yellow visible image. When the magenta developing section 45m is brought into contact with the surface of the photosensitive drum 40, it applies the contained magenta developer (magenta toner) to the surface of the photosensitive drum 40. As a result, the electrostatic latent image on the photosensitive drum 40 is developed into a magenta visible image. When the cyan developing section 45c is brought into contact with the surface of the photosensitive drum 40, it applies the contained cyan developer (cyan toner) to the surface of the photosensitive drum 40. As a result, the electrostatic latent image on the photosensitive drum 40 is developed into a cyan visible image.

A rotary transfer belt 50 is held between the transfer roller 46 and photosensitive drum 40. The transfer roller 46 transfers, to the transfer belt 50, the visible image on the photosensitive drum 40. The transfer belt 50 is tensioned between rollers 51, 52, 53 and 54. A transfer roller 55 is provided at a position opposing the roller 53 with the transfer belt 50 interposed therebetween.

The cleaning unit 47 removes, for example, a developer remaining on the surface of the photosensitive drum 40.

Paper sheets P are picked up one by one from one of the cassettes 5 provided at the lower portion of the main unit 1. A pick-up roller 61 for picking up paper sheets is provided for each cassette. Each picked paper sheet P is separated from each cassette 5 by the corresponding separating roller 62, and sent to a resist roller 63. The resist roller 63 sends each paper sheet P to a space between the transfer belt 50 and transfer roller 55 at the timing made in light of the rotation of the transfer belt 50. The transfer roller 55 transfers a visible image on the transfer belt 50 to each paper sheet P fed by the resist roller 63.

The paper sheet P, to which the visible image on the transfer belt 50 is transferred, is sent to a fixing unit 64. The fixing unit 64 fixes, by heat, the image transferred to the paper sheet P. The image-fixed paper sheet P is sent to the paper ejection unit 10, provided outside the main unit 1, through the paper ejection port 8.

Figure 4:
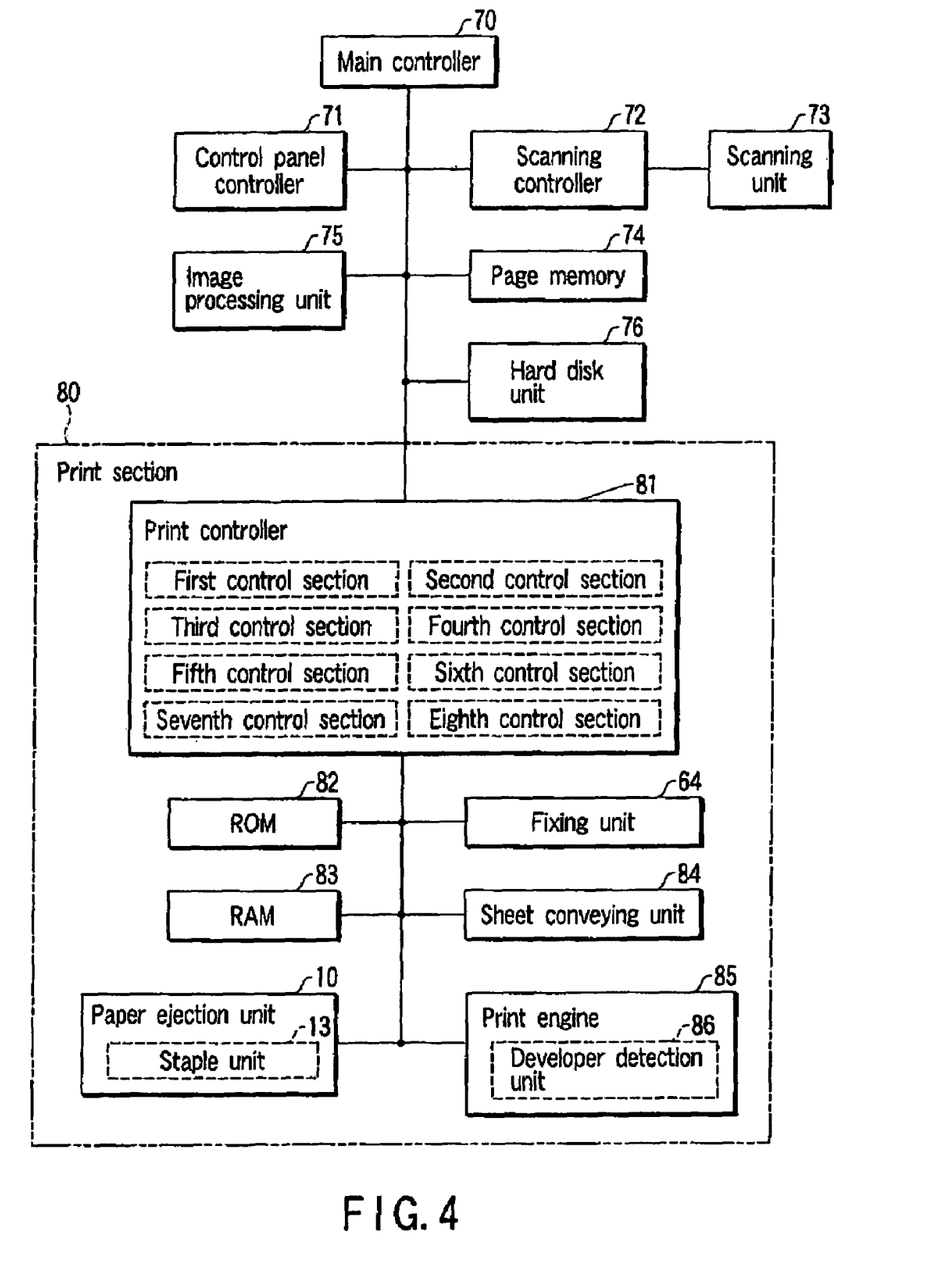
FIG. 4 is a block diagram illustrating a control circuit employed in the embodiment.

FIG. 4 shows a control circuit contained in the main unit 1.

A control panel controller 71, scanning controller 72, image processing unit 74, page memory 75, hard disk unit 76 and print section 80 are connected to a main controller 70.

The main controller 70 wholly controls the control panel controller 71, scanning controller 72, image processing unit 74, page memory 75, hard disk unit 76 and print section 80. The scanning controller 72 controls a canning unit 73 for optically reading an image of each document D. The scanning unit 73 comprises the document table 2, automatic document feeder 3, window 24, carriage 25, exposure lamp 26, reflection mirrors 27, 28 and 29, magnification lens block 30, CCD 31, etc., and outputs image pattern data corresponding to the image of each document D.

The page memory 74 temporarily stores, in units of pages, image pattern data output from the scanning unit 73. The image processing unit 75 reads image pattern data from the page memory 74 and processes it, thereby outputting image data items Y, M, C and K. The image data items Y, M, C and K are supplied to the hard disk unit 76 and print section 80.

The hard disk unit 76 stores, when necessary, the image data items Y, M, C and K output from the image processing unit 75.

Figure 5:
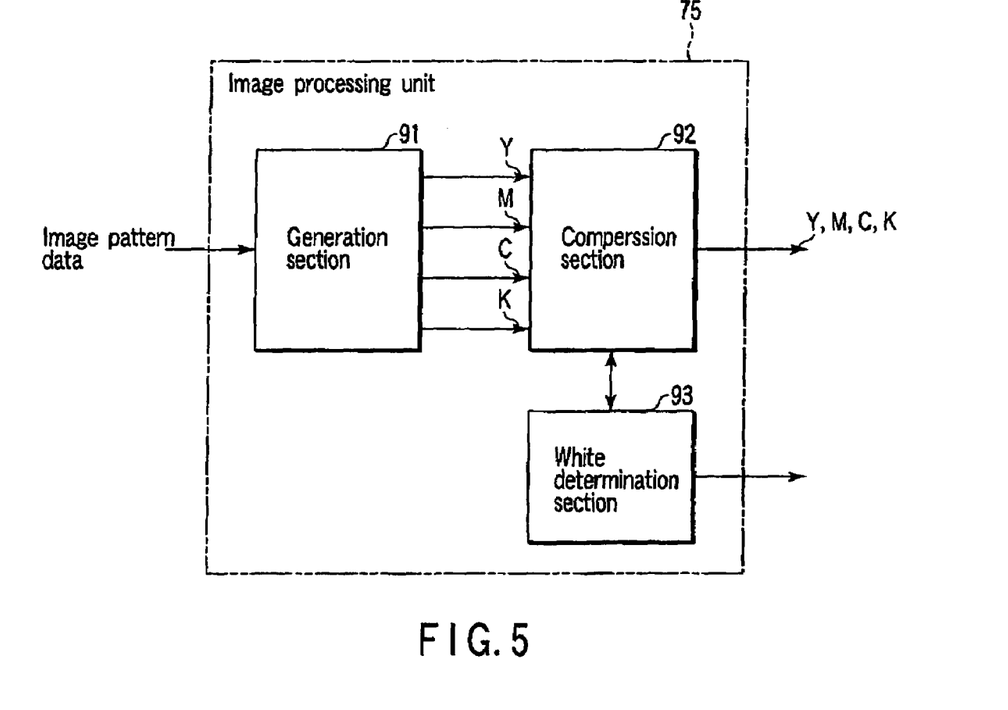
FIG. 5 is a block diagram illustrating an essential part of an image processing unit employed in the embodiment.

As shown in FIG. 5, the image processing unit 75 comprises a generation section 91, compression section 92 and white determination section 93. The generation section 91 analyzes image pattern data read form the page memory 74, thereby generating image data Y indicating a yellow image, image data M indicating a magenta image, image data C indicating a cyan image, and image data K indicating a black image. The compression section 92 performs compression processing on the image data items Y, M, C and K generated by the generation section 91. The compressed image data items Y, M, C and K are sent to the hard disk unit 76 and print section 80. The white determination section 93 belongs to the compression section 92, and determines whether each of the image data items Y, M, C and K generated by the generation section 91 corresponds to a white image. The determination results are sent to the print section 80.

The print section 80 comprises a print controller 81, ROM 82, RAM 83, sheet conveying unit 84, print engine 85, paper ejection unit 10, fixing unit 64, etc.

The print controller 81 controls the sheet conveying unit 84, print engine 85, paper ejection unit 10 and fixing unit 64. The ROM 82 stores a control program used by the print controller 81. The RAM 83 stores data. The sheet conveying unit 84 comprises a conveyance mechanism for paper sheets P, a driving circuit for the mechanism, etc.

The print engine 85 comprises the exposure unit 32, photosensitive drum 40, de-electrifying unit 41, charging unit 42, black developing unit 44, color developing unit 45, transfer roller 46, cleaning unit 47, transfer belt 50, transfer roller 55, developer detecting section 86, etc. The print engine 85 performs monochrome printing in which a black image corresponding to image data K supplied from the image processing unit 75 or hard disk unit 76 is formed on the photosensitive drum 40 using a black developer, and then transferred to a paper sheet using the transfer belt 50. The print engine also performs color printing in which yellow, magenta, cyan and black images corresponding to image data items Y, M, C and K are formed on the photosensitive drum 40 using yellow, magenta, cyan and black developers, and then transferred to a paper sheet.

The developer detecting section 86 detects whether the black developing unit 44 contains a black developer, and whether the color developing unit 45 contains a yellow developer, magenta developer and cyan developer.

Figure 6:
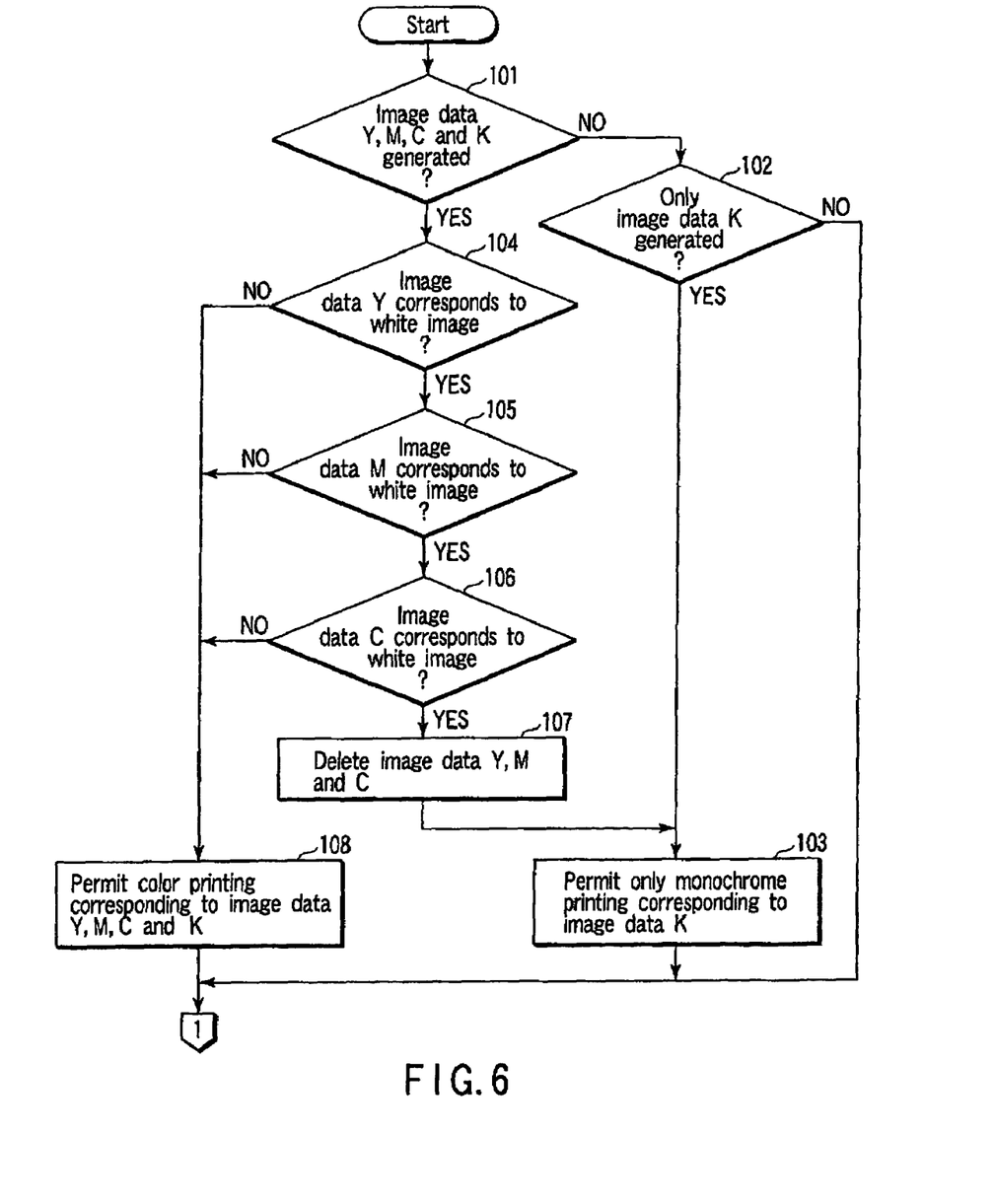
FIG. 6 is a flowchart useful in explaining the function of the embodiment.

The print controller 81 comprises the following sections (1) to (13) as main functional sections:

(1) First control section for permitting monochrome printing corresponding to image data K when the generation section 91 generates only image data K;

(2) Second control section for deleting image data items Y, M and C and permitting monochrome printing corresponding to image data K, when the generation section 91 generates image data items Y, M, C and K and the determination results of the white determination section 93 are affirmative ones (i.e., when image data items Y, M and C correspond to white images);

(3) Third control section for permitting color printing corresponding to image data items Y, M, C and K generated by the generation section 91, when the determination results of the white determination section 93 are negative ones (i.e., when image data items Y, M and C do not correspond to white images);

(4) First determination section for determining whether the print section 80 can perform printing using a remaining developer (developers), if the developer detection section 86 detects that the black developer, yellow developer, magenta developer and/or cyan developer does not remain;

(5) Fourth control section for causing the print section 80 to continue printing, if the determination result of the first determination section is an affirmative one (printing is possible);

(6) Fifth control section for causing the print section 80 to interrupt printing, if the determination result of the first determination section is a negative one (printing is impossible);

(7) Reporting means for reporting a message that the black developer, yellow developer, magenta developer and/or cyan developer does not remain, by displaying the message on the liquid crystal display screen 4a, if the developer detection section 86 detects it;

(8) Second determination section for determining whether there is another print job, when the fifth control section interrupts printing;

(9) Third determination section for determining whether said another printing job is possible using the remaining developer(s), if the determination result of the second determination section is an affirmative one (said another print job exists);

(10) Sixth control section for causing the print section 80 to perform said another print job if the determination result of the third determination section is an affirmative one;

(11) Fourth determination section for determining whether the fifth control section interrupts printing, if the developer detection section 86 detects that all the black developer, yellow developer, magenta developer and cyan developer remain;

(12) Fifth determination section for determining whether the interrupted printing requires stapling, if the determination result of the fourth determination section is an affirmative one (printing is interrupted);

(13) Seventh control section for restarting the interrupted printing from the beginning, if the determination result of the fifth determination section is an affirmative one (stapling is required); and (14) Eighth control section for resuming the interrupted printing from the interrupted portion, if the determination result of the fifth determination section is a negative one Referring now to the flowcharts of FIGS. 6 and 7, the operation will be described.

When a document D is set on the document table 2, and the start key 4b of the control panel 4 is turned on, the document D is optically read by the scanning unit 73. Image pattern data corresponding to the read image is supplied form the scanning unit 73 to the generation section 91 of the image processing unit 75.

The generation section 91 analyzes the image pattern data, and generates image data Y indicating a yellow image, image data M indicating a magenta image, image data C indicating a cyan image, and image data K indicating a black image. Specifically, if the image pattern data corresponds to a monochrome image, only image data K is generated. If the image pattern data corresponds to a color image, image data items Y, M, C and K are generated.

However, there is a case where although the image pattern data corresponds to a monochrome image, image data items Y, M and C are generated, as well as image data K, because of an erroneous analysis of the generation section 91. In this case, although it is sufficient if monochrome printing using only a black developer is performed, color printing using all developers is performed. As a result, a yellow developer, magenta developer and cyan developer are wasted. In light of the quality of printing as well, it is not preferable that color printing is performed instead of monochrome printing when monochrome printing should be performed.

To avoid the above, if the generation section 91 generates only image data K (NO at step 101, YES at step 102), monochrome printing corresponding to image data K is permitted (step 103).

If the generation section 91 generates image data items Y, M, C and K (YES at step 101), the white determination section 93 determines whether each of image data items Y, M and C corresponds to a white image (steps 104, 105, 106).

If the determination result of the white determination section 93 is an affirmative one (each of image data items Y, M and C corresponds to a white image) (YES at step 104, YES at step 105, YES at step 106), image data items Y, M and C included in image data items Y, M, C and K generated by the generation section 91 are deleted (step 107). Monochrome printing corresponding to the remaining data item K is permitted (step 103).

In other words, if image patter data corresponding to monochrome printing is supplied to the generation section 91, and nevertheless the generation section 91 generates image data items Y, M, C and K, image data items Y, M and C do not correspond to yellow, magenta and cyan images, respectively, but each correspond to a white image. In this case, it is determined that the analysis of the generation section 91 is erroneous, and monochrome printing is performed instead of color printing. Since monochrome printing is thus performed, yellow, magenta and cyan developers are prevented from being wasted, and the quality of resultant printing is enhanced.

If the determination result of the white determination section 93 is a negative one (none of image data items Y, M and C corresponds to a white image) (NO at step 104, NO at step 105, NO at step 106), color printing corresponding to image data items Y, M, C and K generated by the generation section 91 is performed (step 108).

If at least image data Y, M or C does not correspond to a white image, it is determined that the analysis of the generation section 91 is correct, and color printing is performed.

As described above, regardless of whether the analysis of the generation section 91 is erroneous, it can be accurately determined whether monochrome or color printing is necessary. This can avoid waste of developers, and enhance the quality of printing.

Figure 7:
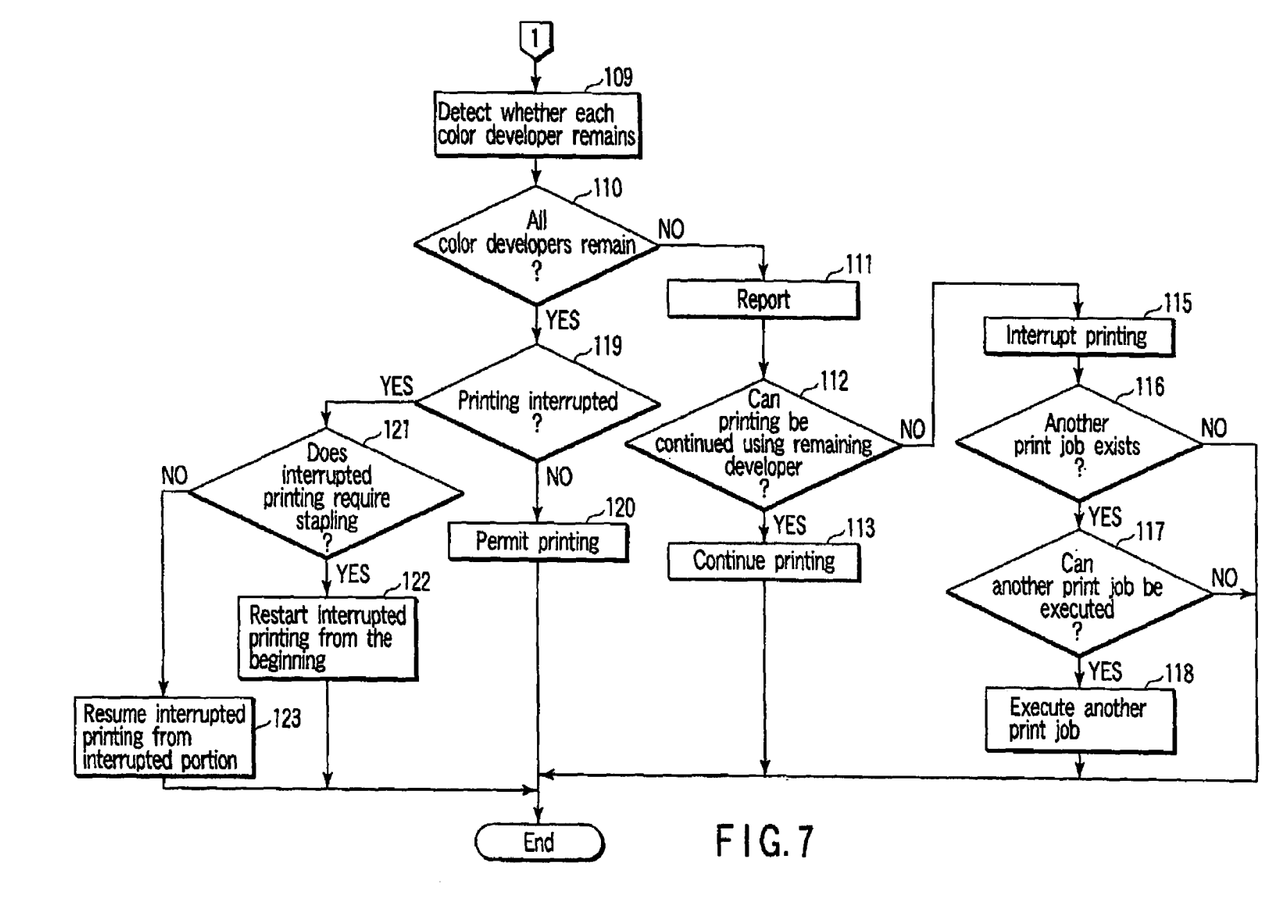
FIG. 7 is a flowchart illustrating the process following FIG. 6.

On the other hand, as shown in the flowchart of FIG. 7, the developer detection section 86 detects whether each of the black, yellow, magenta and cyan developers remains (step 109).

If it is detected that the black, yellow, magenta or cyan developer does not remain, while a print job corresponding to several sheets of paper is being performed (NO at step 110), this is reported on the liquid crystal display screen 4a of the control panel 4 (step 111). Further, it is determined whether printing can be continued using the remaining developers (step 112).

For example, even if it is detected during monochrome printing that no black developer remains, if the yellow, magenta and cyan developers remain, monochrome printing can be continued.

Even if it is detected during color printing that no yellow developer remains, color printing except for yellow, green and red can be continued using the remaining black, magenta and cyan developers.

Even if it is detected during color printing that no magenta developer remains, color printing except for magenta, red and blue can be continued using the remaining black, yellow and cyan developers.

Even if it is detected during color printing that no cyan developer remains, color printing except for cyan, blue and green can be continued using the remaining black, yellow and magenta developers.

Furthermore, if the two-color copy button 4c of the liquid crystal display screen 4a of the control panel 4 is in the ON state, and if, for example, a two-color copy mode of yellow and red is set, the yellow and magenta developers are necessary for yellow and red color printing. Accordingly, printing can be continued if the yellow and magenta developers remain, and if the black or cyan developer does not remain.

If it is determined that printing can be continued using the remaining developers (YES at step 112), printing is continued (step 113).

If it is determined that printing cannot be continued using the remaining developers (NO at step 112), printing by the print section 80 is interrupted (step 115). At this time, it is determined whether there is another print job (step 116).

If there is another print job (YES at step 116), it is determined that said another print job is possible using the remaining developers (step 117). If possible (YES at step 117), said another print job is performed (step 118). The user who has set said another print job can immediately acquire a necessary printing result without waiting for replenishment of the exhausted developers.

After the user replenishes the exhausted developers to complete all developers (YES at step 110), it is determined whether there is a print job interrupted (step 119). If there is no interrupted print job (NO at step 119), print jobs from now on are permitted (step 120).

If there is a print job interrupted (YES at step 119), it is determined whether the interrupted print job requires stapling (step 121). If stapling is required (YES at step 121), the interrupted print job is restarted from the beginning (step 122). By restarting the interrupted print job, a required number of paper sheets can be reliably stapled.

If no stapling is required, the interrupted print job is resumed from the interrupted portion (step 123).

In the above embodiment, determination as to whether stapling is required is set as a determination condition. However, if a saddle stitch function is employed, determination as to whether saddle stitching is required may be set as a determination condition for resuming printing. If a function for designating one of the trays 11 and 12 as the ejection destination of each paper sheet P is employed, determination as to whether each of the trays 11 and 12 has room may be used as a determination condition for resuming printing.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus comprising:
   a generation section configured to analyze image pattern data corresponding to an image of a document to thereby generate image data Y indicating a yellow image, image data M indicating a magenta image, image data C indicating a cyan image, and image data K indicating a black image;

a first control section configured to permit monochrome printing corresponding to the image data K when the generation section generates only the image data K;

a determination section configured to determine whether the image data items Y, M and C each correspond to a white image, when the generation section generates the image data items Y, M, C and K;

a second control section configured to delete the image data items Y, M and C included in the image data items Y, M, C and K generated by the generation section, and to permit monochrome printing corresponding to the remaining image data K, when a determination result of the determination section is an affirmative result; and a third control section configured to permit color printing corresponding to the image data items Y, M, C and K generated by the generation section, when the determination result of the determination section is a negative result.

2. The apparatus according to claim 1, further comprising a print section configured to perform monochrome printing in which the black image corresponding to the image data K is printed on a paper sheet, and to perform color printing in which the yellow image, the magenta image, the cyan image and the black image corresponding to the image data items Y, M, C and K are printed on a paper sheet.

3. The apparatus according to claim 1, further comprising a print section including an image carrier and configured to perform monochrome printing in which the black image corresponding to the image data K is formed on the image carrier and then transferred to a paper sheet, the print section being also configured to perform color printing in which the yellow image, the magenta image, the cyan image and the black image corresponding to the image data items Y, M, C and K are formed on the image carrier and then transferred to a paper sheet.

4. The apparatus according to claim 1, further comprising a print section including an image carrier and configured to perform monochrome printing in which the black image corresponding to the image data K is formed on the image carrier, using a black developer, and is then transferred to a paper sheet, the print section being also configured to perform color printing in which the yellow image, the magenta image, the cyan image and the black image corresponding to the image data items Y, M, C and K are formed on the image carrier, using a yellow developer, a magenta developer, a cyan developer and a black developer, respectively, and are then transferred to a paper sheet.

5. The apparatus according to claim 4, further comprising:

a detection section configured to detect whether each of the yellow developer, the magenta developer, the cyan developer and the black developer remains;

a first determination section configured to determine whether printing by the print section can be continued using at least one remaining developer, when the detection section detects that at least one of the developers does not remain;

a fourth control section configured to cause the print section to continue printing, when a determination result of the first determination section is an affirmative result; and a fifth control section configured to cause the print section to interrupt printing, when the determination result of the first determination section is a negative result.

6. The apparatus according to claim 5, further comprising report means for reporting a message that the at least one of the developers does not remain, when the detection section detects that the at least one of the developers does not remain.

7. The apparatus according to claim 5, further comprising:

a second determination section configured to determine whether there is another print job, when the fifth control section interrupts the printing;

a third determination section configured to determine whether the another print job can be executed using the at least one remaining developer, when a determination result of the second determination section is an affirmative result; and a sixth control section configured to cause the print section to execute the another print, job, when a determination result of the third determination section is an affirmative result.

8. The apparatus according to claim 7, further comprising:

a fourth determination section configured to determine whether the fifth control section has interrupted printing, when the detection section detects that all the developers remain;

a fifth determination section configured to determine whether the interrupted printing requires stapling, when a determination result of the fourth determination section is an affirmative result;

a seventh control section configured to restart the interrupted printing from a beginning when a determination result of the fifth determination section is an affirmative result; and an eighth control section configured to resume the interrupted printing from an interrupted portion when the determination result of the fifth determination section is a negative result.

9. An image forming method comprising:

analyzing image pattern data corresponding to an image of a document to thereby generate image data Y indicating a yellow image, image data M indicating a magenta image, image data C indicating a cyan image, and image data K indicating a black image;

permitting monochrome printing corresponding to the image data K when only the image data K is generated;

determining whether the image data items Y, M and C each correspond to a white image, when the image data items Y, M, C and K are generated;

deleting the image data items Y, M and C included in the generated image data items Y, M, C and K, and permitting monochrome printing corresponding to the remaining image data K, when a determination result is an affirmative result;

and permitting color printing corresponding to the generated image data items Y, M, C and K, when the determination result is a negative result.

10. An image forming apparatus comprising:

means for generating image data configured to analyze image pattern data corresponding to an image of a document to thereby generate image data Y indicating a yellow image, image data M indicating a magenta image, image data C indicating a cyan image, and image data K indicating a black image;

first control means for permitting monochrome printing corresponding to the image data K when the means for generating image data generates only the image data K;

white determination means for determining whether the image data items Y, M and C each correspond to a white image, when the means for generating image data generates the image data items Y, M, C and K;

second control means for deleting the image data items Y, M and C included in the image data items Y, M, C and K generated by the means for generating image data, and to permit monochrome printing corresponding to the remaining image data K, when a determination result of the white determination means is an affirmative result; and third control means for permitting color printing corresponding to the image data items Y, M, C and K generated by the means for generating image data, when the determination result of the first determination means is a negative result.

11. The apparatus according to claim 10, further comprising means for printing configured to perform monochrome printing in which the black image corresponding to the image data K is printed on a paper sheet, and to perform color printing in which the yellow image, the magenta image, the cyan image and the black image corresponding to the image data items Y, M, C and K are printed on a paper sheet.

12. The apparatus according to claim 10, further comprising means for printing, the means for printing including an image carrier and configured to perform monochrome printing in which the black image corresponding to the image data K is formed on the image carrier and then transferred to a paper sheet, the means for printing being also configured to perform color printing in which the yellow image, the magenta image, the cyan image and the black image corresponding to the image data items Y, M, C and K are formed on the image calTier and then transferred to a paper sheet.

13. The apparatus according to claim 10, further comprising means for printing, the means for printing including an image carrier and configured to perform monochrome printing in which the black image corresponding to the image data K is formed on the image carrier, using a black developer, and is then transferred to a paper sheet, the means for printing being also configured to perform color printing in which the yellow image, the magenta image, the cyan image and the black image corresponding to the image data items Y, M, C and K are formed on the image carrier, using a yellow developer, a magenta developer, a cyan developer and a black developer, respectively, and are then transferred to a paper sheet.

14. The apparatus according to claim 13, further comprising:

detection means for detecting whether each of the yellow developer, the magenta developer, the cyan developer and the black developer remains;

first determination means for determining whether printing by the means for printing can be continued using at least one remaining developer, when the detection means detects that at least one of the developers does not remain;

fourth control means for causing the means for printing to continue printing, when a determination result of the first determination means is an affirmative result; and fifth control means for causing the means for printing to interrupt printing, when the determination result of the first determination means is a negative result.

15. The apparatus according to claim 14, further comprising:

second determination means for determining whether there is another print job, when the fifth control section interrupts the printing;

third determination means for determining whether the another print job can be executed using the at least one remaining developer, when a determination result of the second determination means is an affirmative result; and sixth control means for causing the means for printing to execute the another print job, when a determination result of the third determination means is an affirmative result.

16. The apparatus according to claim 15, further comprising:

fourth determination means for determining whether the fifth control means has interrupted printing, when the detection means detects that all the developers remain;

fifth determination means for determining whether the interrupted printing requires stapling, when a determination result of the fourth determination means is an affirmative result;

seventh control means for restarting the interrupted printing from a beginning when a determination result of the fifth determination means is an affirmative result; and eighth control means for resuming the interrupted printing from an interrupted portion when the determination result of the fifth determination means is a negative result.

* * * * *

UNITED STATES PATENT AND TRADEMARK OFFICE
CERTIFICATE OF CORRECTION

PATENT NO. : 7,242,877 B2 Page 1 of 1
APPLICATION NO. : 11/018509
DATED : July 10, 2007
INVENTOR(S) : Watanabe et al.

It is certified that error appears in the above-identified patent and that said Letters Patent is hereby corrected as shown below:

Column 11 line 33, replace "calTier" with --carrier--

Signed and Sealed this

Seventh Day of August, 2007

JON W. DUDAS
*Director of the United States Patent and Trademark Office*